April 26, 1966 T. J. O'CONNOR 3,247,599

MEASURING DEVICE

Filed June 17, 1963

INVENTOR.
THOMAS J. O'CONNOR
BY Whittemore
Hulbert & Belknap
ATTORNEYS

United States Patent Office 3,247,599
Patented Apr. 26, 1966

3,247,599
MEASURING DEVICE
Thomas J. O'Connor, Ann Arbor, Mich., assignor of one-half to Dale R. Smith, Detroit, Mich.
Filed June 17, 1963, Ser. No. 288,395
4 Claims. (Cl. 33—185)

The invention relates to a method of and apparatus for measuring and refers more specifically to a method of and apparatus for indicating electrical continuity in a circuit to establish exact distances measured whereby variations in distances measured resulting from human error are reduced.

In the past measuring of exact distances by devices, such as depth gages, calipers, micrometers and the like, have required positive contact of two points or with surfaces or points the distances between which it is desired to measure. In prior measuring devices and with prior measuring methods it has been necessary to move one member of the measuring device into contact with one of the points or surfaces between which a measurement is to be taken and to indicate the movement of another member of the device relative to the one member thereof on movement of the other member into contact with the other point or surface. With such methods and measuring devices it will be readily recognized that the distance measured will be determined to some extent by the feel of the mechanic doing the measuring since many points or surfaces between which measurements are taken are constructed of materials sufficiently soft to permit indentation thereof by the measuring device or are supported by means flexible enough to be deflected by a pressure so slight as to be undetectable by the mechanic whereby the distance plus the indentation or deflection is measured rather than only a required distance.

This problem is present, for example, in positioning electrodes in electrical discharge machining where the electrodes must be positioned a predetermined distance from a surface of a member being machined and where the electrode is a particularly long slender electrode subject to considerable deformation without providing the usual resistance to movement recognized by a mechanic as an indication of the establishment of the exact distance to be measured. In this example deflection as well as the required distance is measured. Such errors of alignment are further compounded due to the fact that different mechanics have a different gage feel causing more or less deflection of the electrode to be included in the measurement.

It is therefore one of the objects of the present invention to provide an improved method of and means for measuring exact distances.

Another object is to provide improved apparatus for measuring exact distances with a minimum of error due to the gage feel of a mechanic using it.

Another object is to provide a method for measuring exact distances requiring no interpretation of the feel of a gage setting force by a mechanic.

Another object is to provide improved apparatus for measuring exact distances including electric means for establishing required setting of the apparatus.

Another object is to provide a method for measuring exact distances on material capable of conducting electricity comprising positioning a first member of a measuring device which member is capable of conducting electricity at one end of the distance to be measured, connecting an electric meter between a second conductive member of the measuring device and the first member thereof and moving said second member of the device toward the other end of the distance to be measured until electric continuity is established between the two members of the device through the material.

Another object is to provide apparatus for exactly establishing the distance between surfaces on material capable of conducting electricity comprising a measuring device having two relatively movable members capable of conducting electricity positionable at the opposite ends of the distance to be measured, means for indicating the relative position of the two members, means electrically insulating the members from each other and means for connecting a low voltage electric circuit continuity indicator between the two members of said measuring device.

Another object is to provide a method of positioning an electrode in a predetermined position with respect to a surface of a workpiece of material capable of conducting electricity secured in electrical discharge machining apparatus including a movable head for receiving the electrode comprising positioning the electrode in the head of the electrical discharge machining apparatus, adjusting a depth gage to a predetermined distance, placing of members of the gage in a fixed position relative to the surface of the workpiece, and moving the head of the electrical discharge machine relative to the surface of the workpiece until an indication of electrical continuity is first established on an electrical indicator connected between said another member of the depth gage and the electrode.

Another object is to provide means for positioning an electrode with respect to a surface of a workpiece secured in electrical discharge machine apparatus including a movable head in which the electrode is received comprising a measuring device including a first member positionable in engagement with said surface, a second member of material capable of conducting electricity movable with respect to said first member to establish a selected distance, and an electric meter for indicating establishment of electric continuity between the electrode and the second member on movement of the head to move the electrode toward the second member of the measuring device connected between the electrode and the second member.

Another object is to provide a method of and means for exact measurement of distances which is simple, economical and efficient.

Other objects and features of the invention will become apparent as the description proceeds, especially when taken in conjunction with the accompanying drawings, illustrating preferred embodiments of the invention, wherein.

Figure 1:
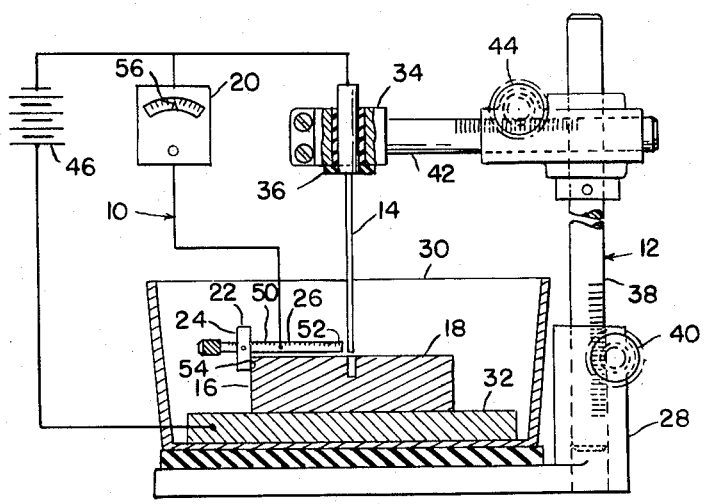
FIGURE 1 is a diagrammatic representation of electrical discharge machining apparatus having measuring apparatus associated therewith for exactly locating an electrode with respect to a surface of a workpiece which substantially eliminates human errors due to gage feel in using the measuring device of the measuring apparatus.

With particular reference to the figures of the drawing, one embodiment of the present invention will now be considered in detail.

As shown in FIGURE 1 the measuring apparatus 10 is applied to electrical discharge machining apparatus 12 to exactly position the electrode 14 from the surface 16 of the workpiece 18. As shown the measuring apparatus 10 includes an electric indicator 20, such as a low voltage ohm meter, and a measuring device 22 having the member 24 adapted to be held in a fixed position and further having the movable conductive member 26 adapted to be moved relative to the fixed member 24 which members are insulated from each other electrically.

In operation the member 26 is moved relative to the fixed member 24 to establish a desired distance between the surface 16 and the electrode 14. The electrode 14 is then moved toward member 26 until electrical continuity is established therebetween, as indicated by meter 20, at which time the exact position of the electrode 14 with respect to the surface 16 will be established.

More specifically the electrical discharge machining apparatus 12 which is here shown schematically includes a base 28 supporting thereon the container 30 in which a workpiece of conductive material 18 is positioned on conductive plate 32 and a head 34 carrying the electrode 14 and insulated therefrom by convenient insulating means 36. Head 34 is movable axially with shaft 38 on rotation of, for example, gear 40 and is movable axially with the shaft 42 on rotation of drive means 44 therefor.

In electrical discharge machining the electrode 14 is positioned over the workpiece 18 and electrical sparks are caused to be produced between the electrode 14 and workpiece 18 due to an impressed voltage between the workpiece and electrode supplied by the power supply 46 which may be a pulsed direct current power supply and which is connected at one end to the electrode 14 and the other end to the plate 32, as shown in FIGURE 1.

Electrical discharge machining apparatus of this nature is well known in the art and will not therefore be considered in greater detail herein. For a more complete disclosure of one example of such electric discharge machining apparatus reference is made to applicant's copending application, Serial No. 250,321, filed January 9, 1963.

Figure 2:
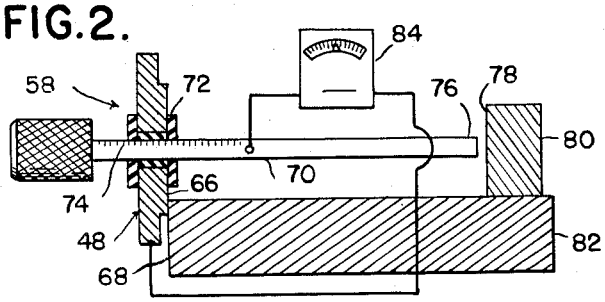
FIGURE 2 is a diagrammatic representation of measuring apparatus constructed in accordance with the invention in the form of a depth gage.

The measuring device 22 is similar to the depth gage 58 illustrated in FIGURE 2 of the drawings. The member 26 is constructed of material capable of conducting electricity. The member 24 is constructed of non-conductive material. Member 26 is movable axially with respect to the member 24 and a scale 50 is provided thereon from which relative movement of the members 24 and 26 may be read to indicate the distance between the end 52 of the member 26 and the surface 54 of the member 24.

In the measuring apparatus illustrated in FIGURE 1 a low voltage ohm meter 20 is connected between the electrode 14 secured in the head 34 of the electrical discharge machining apparatus 12 and the member 26 of the measuring device 22.

Thus in use when it is desired to exactly position the electrode 14 from the surface 16 of the workpiece 18, the surface 54 of member 24 is placed in fixed contact with the surface 16 with the member 26 of the measuring device 22 positioned with respect to the member 24 thereof to define the desired distance between the surface 16 and the electrode 14 between the surface 54 and the end 52 of member 26 as indicated on scale 50. The electrode 14 is then moved toward end 52 of member 26 by movement of head 42 of the electrical discharge machining apparatus 12. When the end 52 of the member 26 reaches a fixed predetermined distance from the electrode 14 depending on the voltage of the ohm meter 20 the electrical resistance between the tip 52 of the member 26 and the electrode 14 of the electrical discharge machining apparatus 12 will decrease abruptly. Electrical continuity will thus be established in the closed circuit including the electrode 14, the member 52 of the measuring device 22 and the indicator 20. Establishing electric continuity in this circuit causes the needle 56 of the indicator 20 to fluctuate at which time movement of the head 34 is halted with the electrode 14 in the desired position relative to surface 16 of workpiece 18.

Thus a mechanic may fix the exact distance between the surface 16 and the electrode 14 without the necessity of touching the electrode 14 with the movable end 52 of the measuring device 22 which has formerly been required. Measurements wherein the end 52 of the measuring device 22 has been required to contact the electrode 14 have usually been inaccurate in the past due to deformation which is not felt in long slender electrodes 14. Also, errors in such measurements have previously been possible due to the different forces used by different mechanics with different gage feeling in conducting the measurements. The measuring apparatus 10 provided in accordance with the invention eliminates such errors and permits exact positioning of electrodes 14 since electrical continuity determines measurements exactly the same for all mechanics without the necessity of producing any mechanical force on the electrode 14.

Figure 3:
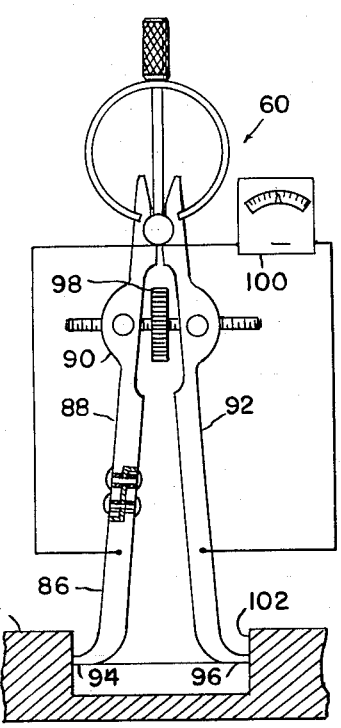
FIGURE 3 is a diagrammatic representation of measuring apparatus constructed in accordance with the invention in the form of internal calipers.
Figure 4:
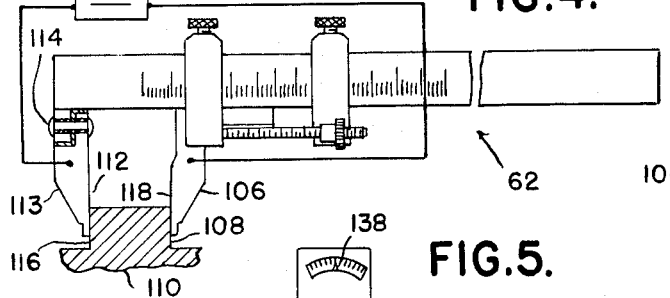
FIGURE 4 is a diagrammatic representation of measuring apparatus constructed in accordance with the invention in the form of vernier calipers.
Figure 5:
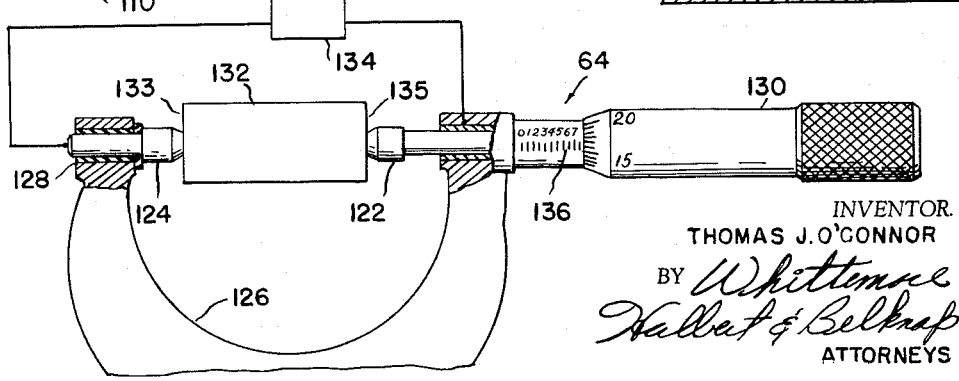
FIGURE 5 is a diagrammatic representation of measuring apparatus constructed in accordance with the invention in the form of a micrometer.

The principles involved in the measuring apparatus 10 explained above in conjunction with the electrical discharge machining apparatus 12 for exactly positioning electrodes 14 may be applied equally well to separate measuring devices. Examples of such separate structure are the depth gage 58 illustrated in FIGURE 2, the internal calipers 60 illustrated in FIGURE 3, vernier calipers 62 illustrated in FIGURE 4, and the micrometer 64 illustrated in FIGURE 5.

Each of these measuring devices are similar in that two relatively moving members of conductive material are provided, the relative separation of which provides a measurement of distance. In accordance with the invention the relatively movable members are insulated from each other and an ohm meter is connected between the two relatively movable members. Thus when the workpiece is a conductive member electrical continuity will be established between the relatively movable members as the distance to be measured is closely approached which electrical continuity will be registered by a low voltage ohm meter.

Specifically, as illustrated in FIGURE 2, the depth gage 58 comprises the conductive member 48 having a surface 66 adapted to be positioned against a surface 68 of a conductive workpiece and an elongated member 70 insulated from the member 48 by insulating material 72 and movable axially relative thereto. A scale 74 is provided on member 70 whereby the relative movement between the end 76 of member 70 and the surface 66 of member 48 will provide an indication of the distance between the surface 68 and the end 76 of the member 70.

Thus if it is desired to measure the distance between the surface 68 and the surface 78 of a conductive member 80 which is either a portion of the member 82 having the surface 68 or is electrically connected thereto, surface 66 of member 48 is positioned against surface 68 of member 82, the member 70 is then moved axially until the end 76 thereof approaches the surface 78 so closely as to cause electrical continuity therebetween which electrical continuity is indicated on the low voltage ohm meter 84. The distance between the surfaces 68 and 78 may then be read from the scale 74.

The inside calipers 60 operate in substantially the same manner. In particular it will be noted that the portion 86 of the leg 88 of the calipers 60 is insulated from the portion 90 of the leg 88. Thus as the legs 88 and 92 are spread so that the contact points 94 and 96 thereof are moved radially outwardly on rotation of adjusting wheel 98, immediately preceding the contact of both points 94 and 96 with the conductive workpiece 104, electrical continuity will be established through the ohm meter 100 to produce an indication thereon whereby the exact inside dimension of the recess 102 will be provided between the contact points 94 and 96.

The dimension of the recess 102 will be accurately measured by different mechanics having different gage feel since electrical continuity establishes the point at which spreading of the contact points 94 and 96 is to be stopped. Individual gage feel thus has no part in the measurement and no mechanical forces are provided on the legs 88 and 92 of the calipers whereby even slight deflection thereof might occur or the points 94 and 96 might be embedded in the material of the workpiece 104.

Similarly in operation of the vernier calipers 62 the arm 106 is moved toward the surface 108 of the workpiece 110 with the surface 112 of the insulated portion 113 of the fixed arm 114 in engagement with the surface 116 of the workpiece 110 until the surface 118 of the movable arm 106 is so close to the surface 108 of the workpiece 110 that electrical continuity is established across the remaining air gap and through the low voltage ohm meter 120. As before exact distance measurements which are repeatable by unskilled mechanics may thus be obtained.

Likewise with the micrometer 64 as the movable conductive abutment 122 is moved toward the fixed conductive abutment 124 which is insulated from the frame 126 of the micrometer by the insulating bushing 128 on rotation of the micrometer handle 130 electrical continuity is established between the abutments 122 and 124 through the conductive workpiece 132 and the low voltage ohm meter 134 whereby an exact measurement of workpiece 132 between surfaces 133 and 135 from the micrometer scale 136 may be obtained by mechanics having different micrometer feels merely by observing the micrometer adjustment at which the indicator 138 of the ohm meter 134 first fluctuates.

The sensitivity of the usual low voltage ohm meter wherein the voltage is approximately six volts in measuring apparatus as disclosed is approximately one-quarter of a millionth of an inch. The sensitivity of the measuring apparatus as disclosed can be increased or decreased to some extent by varying the voltage of the ohm meter used to indicate establishment of electrical continuity since the electrical continuity is a function of voltage and air gap.

While one embodiment of the present invention and several modifications thereof have been considered in detail it will be understood that other embodiments and modifications of the invention are contemplated. It is therefore the intention to include all such modifications and embodiments as are defined by the appended claims within the scope of the invention.

What I claim as my invention is:

1. In combination with electrical discharge machining apparatus including a conductive electrode supporting head, a conductive electrode supported by and insulated from said head and conductive means for supporting a conductive workpiece in electrical continuity therewith below said electrode, means for exactly positioning the electrode from a predetermined surface of the workpiece comprising a first member positioned in a fixed position with respect to the predetermined surface of the workpiece, a second member of conductive material movable relative to said first member for establishing a predetermined distance between the surface and electrode, and a low voltage ohm meter connected between said second member and said electrode for providing an indication of electrical continuity between said second member and electrode as said electrode is moved toward said second member.

2. The method of exactly positioning an electrode with respect to a workpiece in electrical discharge machining apparatus comprising positioning a fixed member of a measuring device in rigid contact with a surface of a workpiece the distance from which the electrode is to be located exactly, moving a second member of the measuring device to establish the exact desired distance of the electrode from said surface, moving the electrode toward said second member, providing an indication of the establishment of electrical continuity between the electrode and second member during movement of the electrode toward said second member, and stopping the movement of the electrode toward said second member on indication of the establishment of electrical continuity therebetween.

3. In combination with electrical discharge machining apparatus including an electrically conducting head for supporting an electrode, an electrode supported by the head, means for moving the head to adjust the position of the electrode, distance measuring apparatus for measuring predetermined distances from a fixed surface including an electrically conducting measuring member for recording the predetermined distance from the fixed surface and means operably associated with the electrode and measuring device for indicating electrical continuity between the electrode and the measuring member of the measuring device.

4. The method of positioning an electrode in electrical discharge machining apparatus including a movable electrically conducting head without applying lateral force to the electrode comprising securing thhe electrode in the movable head of the electrical discharge machining apparatus, positioning a measuring device having an electrically conducting member registering a predetermined distance at which it is desired to position the electrode from a predetermined surface in engagement with the predetermined surface, connecting electrical continuity indicating structure between the electrically conducting member of the measuring device and the electrode, moving the electrode toward the electrically conducting member of the measuring device until electrical continuity is indicated on the electrical continuity indicating structure and then stopping the movement of the electrode.

References Cited by the Examiner

UNITED STATES PATENTS

| 2,401,962 | 6/1946 | Reynolds | 33—147 |
| 2,445,068 | 7/1948 | Jackson | 33—149 |
| 2,521,917 | 9/1950 | Holliday et al. | 33—164 |
| 2,662,293 | 12/1953 | Rutherford | 33—164 |

OTHER REFERENCES

"Bureau of Standards Journal of Research," vol. 10, page 578.

"Measuring to 0.000025 in. Without Pressure," Electrical Manufacturing, October 1941, FIG. 1B (discussion of Carson Instrument Specialties Co.).

ISAAC LISANN, *Primary Examiner.*

LOUIS R. PRINCE, *Examiner.*